United States Patent [19]

Pausch et al.

[11] 3,966,878

[45] June 29, 1976

[54] METHOD FOR REMOVING POLLUTANTS FROM A GASEOUS MIXTURE

[75] Inventors: Josef Pausch, Minnetonka; Sung Lim Kwon, St. Paul, both of Minn.

[73] Assignee: General Resource Corporation, Hopkins, Minn.

[22] Filed: Nov. 8, 1973

[21] Appl. No.: 413,928

[52] U.S. Cl. ............................................. 423/242
[51] Int. Cl.² ........................................ C01B 17/00
[58] Field of Search ............................ 423/242–244

[56]  References Cited
UNITED STATES PATENTS

| | | | |
|---|---|---|---|
| 3,411,864 | 11/1968 | Pallinger | 423/242 |
| 3,615,165 | 10/1971 | Clement | 423/242 |
| 3,773,472 | 11/1973 | Hausberg et al. | 423/242 |

*Primary Examiner*—Oscar R. Vertiz
*Assistant Examiner*—Gregory A. Heller
*Attorney, Agent, or Firm*—Arthur S. Caine

[57] ABSTRACT

Method and apparatus for treating of waste gases, such as hot-flue gases, to remove therefrom pollutants in the form of solids, such as fly-ash and the like; and also for the removal of chemical substances present in a gaseous form, such as the oxides of sulphur. The solid waste materials, such as fly-ash, are removed from the flue gases by mechanical separation, while the gaseous pollutants, such as sulphur dioxide and/or sulphur trioxide are removed by a scrubbing action with another chemical substance carried in a solution and dispersed by spray action. The polluted gas is preferably first passed through some form of mechanical separator for removal of solids, and is then passed through a sinuous channel, preferably contaning a U-shaped chamber, wherein as the gas descends through one leg of said chamber, it is sprayed with the reactive solution to produce a precipitate that descends to the base of the chamber by gravity, and as the gas ascends through the other leg of the chamber, it is again treated with said solution to react and remove as much of the gaseous pollutant as is possible.

By reason of the high temperature of the flue gases, and the control of the flow of the fluids, the precipitate is in a dry and powdery condition, wherein it can be collected either in the treatment chamber, or by subsequent mechanical separation. The solids either in the form of fly-ash, or the reaction product of the chemical treatment, and particularly the latter, may have commercial value for other purposes.

7 Claims, 1 Drawing Figure

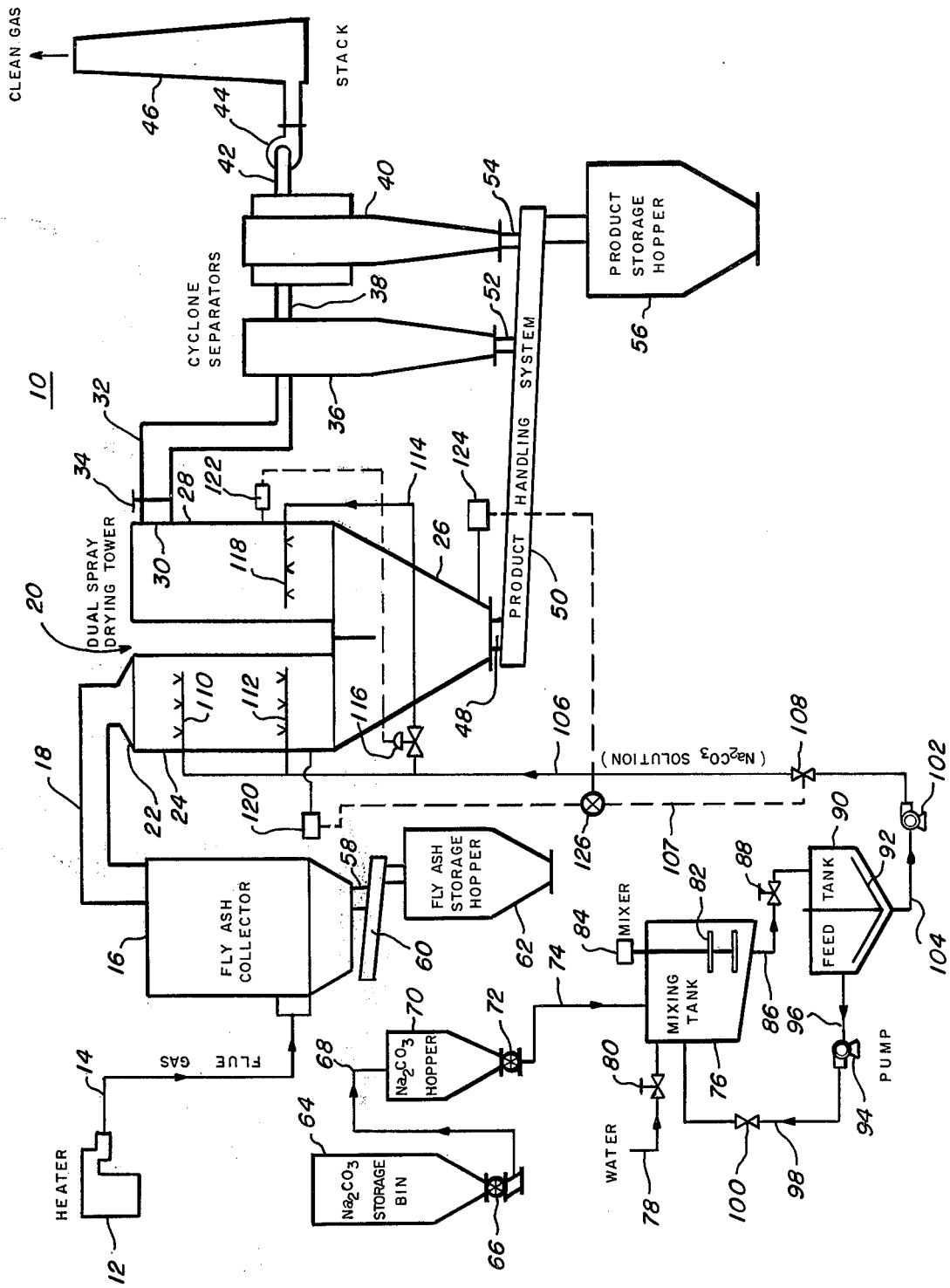

METHOD FOR REMOVING POLLUTANTS FROM A GASEOUS MIXTURE

THE INVENTION

This invention relates to improvements in the treatment of waste gases, such as a hot gaseous mixture, produced by combustion in a furnace or the like, in which pollutants may consist of active chemical substances, as well as solids and other inert gas.

It is well known that fossil fuels, such as coal and petroleum products contain, in addition to the hydrocarbons, sulphur or materials combined with sulphur, and the combustion process combines these materials into chemically active substances in a gaseous form that may contain $SO_2$ and/or $SO_3$, which are highly undesirable, since these gases are injurious in themselves and in the presence of moisture may form sulphurous or sulphuric acids.

In the present invention, in addition to providing means for removing solids from the flue gases, provision is also made to remove the sulphurous products by reacting the same with another substance such as $Na_2CO_3$, and thereby formulate a dry crystalline compound that would have commercial value.

In more particularity, the chemical reaction causing such precipitation and the removal of pollutants from the dustgas mixture may, in the preferred embodiment, involve a novel apparatus and method of desulphurization of hot flue gas.

An object of the invention is to provide an improved method and means for treating a polluted gaseous mixture, such as hot flue gas by mechanically removing particulate solid matter therefrom, and further, by removing other pollutants in the hot flue gas by chemical reaction, causing precipitation thereof in a novel manner.

A further object of the invention is in the provision of a novel method and apparatus for removing a pollutant from a hot gaseous mixture by passing the mixture through a channel having therein at least two non-horizontal portions wherein the mixture is subject to reaction with another chemically active substance to produce precipitation of the newly formed compound in a step-by-step manner.

A further object of the invention is in the provision of a novel method and apparatus for removing a pollutant, such as $SO_2$, and/or $SO_3$ from a hot gaseous mixture wherein the flue gas is exposed to a strong but mist-like flow of a reagent, such as $Na_2CO_3$ in solution, which chemically reacts with the pollutant to produce precipitation while the gas flow is in one direction, such as descension in a passage, during which a major portion of the sulphurous substance in the gas is precipitated, and following a substantial reversal of direction of flow of the flue gas to expose the remaining $SO_2$ and/or $SO_3$ in the gas to a further mist-like spray of the same reagent solution for further precipitation.

The above and further objects of the invention may become apparent by reference to the accompanying drawings, showing a preferred embodiment thereof, along with the accompanying description thereof.

The sole FIGURE, comprising the drawing, shows in a flow diagram a novel method and system for eliminating pollutants in flue gas emitted from a furnace.

In said FIGURE, a pollutant removing system in its entirety, indicated by general numeral 10, receives hot flue gas from a furnace 12, through a conduit 14. The flue gas, as it leaves furnace 12 has a temperature of about 300°–350°F., and includes various pollutants which render the flue gas below an allowable ecological standard for delivery to the atmosphere. Consequently, the flue gas is delivered to a fly-ash collector 16, wherein a major portion of the entrained solids are removed and from which the gas flows through a suitable conduit 18 to a novel separating tower 20.

The separating tower 20 is of generally sinuous, or U-shaped configuration. Its inlet end 22 extends from conduit 18 to a non-horizontal or descending portion or passage 24 that joins one side of a hopper 26. The hopper 26, in turn, is connected to a non-horizontal or ascending portion or passage 28 of the tower that has a discharge opening 30 that joins a conduit 32 containing a damper 34. Conduit 32 extends to a filtering device 36, which device is connected by a conduit 38 to a further filtering device 40. From the filtering device 40, a conduit 42 extends to a blower 44 which, in turn, connects to a chimney or other gas disposal device 46.

Hopper 26 forms a common connecting passage between portions 24 and 28 of the tower 20, and its lower end is connected by a conduit 48 to a discharge trough 50 of a product handling system. Trough 50 is also connected by discharge conduits 52 and 54 from the filtering devices 36 and 40, and extends to a common collecting container 56.

The fly-ash collector 16 has a discharge passage 58 which extends to a trough 60, which, in turn, connects to a disposal container or fly-ash storage hopper 62.

To provide a solution to chemically react with sulphurous substances in the gas, a storage bin 64 adapted to receive a chemically active material, such as $Na_2CO_3$, or other basic material, is provided with a valve 66 that forms a controlled passage to a conduit 68 which, in turn, extends to a hopper 70. Hopper 70 is provided with a valve 72 connecting to a conduit 74 which extends to a mixing tank 76. A water supply line 78, containing a valve 80 also extends to the mixing tank 76. The tank 76 is provided with an agitator 82, driven by a motor means 84. A conduit 86, containing a valve 88 extends from the mixing tank 76 to a feed tank 90, which contains a screen or other filtering device 92. A pump 94 has its inlet connected by a conduit 96 to the feed tank 90, and said pump has its discharge end connected to a pipe 98 extending to the mixing tank 76, and contains a valve 100.

A pump 102 has its inlet end connected to a conduit 104 which extends from a lower end of the feed tank 90. Said pump has its discharge end connected to a conduit 106 which contains a valve 108 and extends to a spray-head 110 located in the upper end of portion 24 of tower 20. Another spray-head 112 also extends from conduit 106 within the tower portion 24 beneath the spray-head 110, but above the hopper portion 26. A conduit 114 containing a valve 116 extends from conduit 106 to a spray-head 118 that is disposed within the interior of portion 28 of the tower 20.

Reference numeral 120 designates a sensing device which is reactive to a condition within portion 24 of the tower 20, such as the proportion of sulphurous material present in the gases in that portion of the tower downstream of spray-heads 110, 112 in the direction of gas flow. Reference character 122 indicates a similar sensing device that is reactive to the condition of the gases in portion 28 of tower 20 downstream of spray-head 118. The sensor 120 is operatively connected to valve 108; while sensor 122 is operatively connected to the valve 116, each of said sensors being adapted to control the positioning of the respective valves 108 and 116 so as to control or modulate the quantity of material such as the reactive solution through the respective valves. A sensor 124 for sensing humidity or other similar conditions within the lower portion of hopper 26 is operatively connected to a differential control device 126 which also, like sensor 120, has the capacity of controlling valve 108.

The operation of the invention and the system disclosed in the drawing will now be discussed. With combustion of fossil fuel occurring in the furnace 12, hot waste flue gases emitted from the furnace at about 300°–350°F. are transmitted through conduit 14 to the fly-ash collector 16 where a major portion of the solids present in the gases will be removed. The gas, with other pollutants therein, then passes through conduit 18 to the inlet end of tower 20, where it flows downwardly through the leg 24. A reactive solution composed of about 5–12% of $Na_2CO_3$ in water is formed in the mixing tank 76 and dispensed to the feed tank 90. The solution is circulated between the mixing tank and the feed tank to maintain a relatively uniform solution. The solution is then delivered by pump 102 to conduit 106 and through the valve 108 therein to the sprayheads 110, 112, where it is sprayed in a mist-like form into the gases descending through portion 24 of the tower 20, preferably in opposition to the direction of flow of the gas. The following chemical reaction occurs:

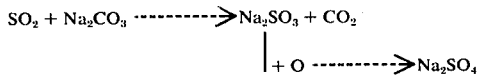

and

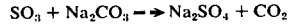

In a typical reaction with the products of combustion of a fossil fuel the above specified compounds produce approximately 71–76% $Na_2SO_3$ (sodium sulphite) and 10–20% $Na_2SO_4$ (sodium sulphate), depending upon the combustion conditions and the fuel composition.

The gases flowing downwardly from the leg or portion 24 into hopper 26 will normally not be completely free of the sulphurous compounds, but these gases then flow upwardly through the leg or portion 28, where they are again subjected to a spray treatment with the $Na_2CO_3$ solution, which in this instance is sprayed downwardly against the flow path of the gas. The control of the flow of solution to spray-heads 110, 112 and 118 is by the valves 108 and 116 responding to the sensors 120 and 122.

The total flow of the $Na_2CO_3$ solution is controlled so that a maximum amount of $SO_2$ and/or $SO_3$ are removed from the flue gas, but in a condition such that the precipitate is relatively dry. The sensor 120 acts to allow flow of solution through valve 108 to remove a major portion of the sulphurous substances from the gas, but in the interest of economical use of the $Na_2CO_3$ solution there should be a small amount of sulphurous substance remaining in the flue gas entering hopper 26 and passing upwardly through the portion 28. However, the sensing device 122, which reacts to the gases after treatment by the spray-head 118 should substantially eliminate free $SO_2$ and/or free $SO_3$ from the flue gases. It is highly desirable that the precipitate be in a dry dust-like condition, and despite treatment of the gases with a water-containing solution, this is possible because of the high temperature of the gases. Nonetheless, the control device 124 is reactive to the humidity conditions in the hopper 26 and its function is to coordinate the total flow of liquid through the valve 108.

As a further control of the reaction between the $Na_2CO_3$ and the sulphurous oxides within the flue gases in tower 20, damper 34 is utilized to control the flow of gases from tower 20 to and through the filtering devices 36 and 40 to the chimney 46. Damper 34 controls flow rate of the gas and thus the time that gases are in tower 20, thereby yielding more efficient and complete cleaning of the $SO_2$, $SO_3$ from the gas. Therefore, proper control of the chemical reactions and of the mechanical filtration is subject to control on the one hand by the sensing devices 120, 122 and 124, and also by the flow control device 34.

After leaving leg or portion 28 of tower 20, the gases flow through filtering devices 36 and 40, which are composed of cyclone separators, or other forms of mechanical separators that will remove any residual portion of the precipitate, or other solids present in the waste gases before they are discharged by blower 44 through the chimney 46.

The solid materials constituting the precipitates and other solid materials, if any, are gathered in the product storage hopper 56. As noted above, a major portion of this material may consist of $Na_2SO_3$ (sodium sulphite), which will find commercial value in other industries, such as paper making or the like.

We claim:

1. A method of treating a high temperature waste gaseous product containing a chemically active substance consisting of $SO_2$, $SO_3$, or mixtures thereof, comprising the steps of:
   a. passing said gaseous product at its elevated temperature through the interior of a substantially upright U-shaped channel;
   b. dispersing as a mist into the interior of said channel in at least one limited area therein within the flow path of said gaseous product, an aqueous solution containing a material which reacts with the chemically active substance in said gaseous product producing a precipitate, and concomitantly evaporating the moisture of the mist by the elevated temperature of said gaseous product to form a separable relatively dry reaction product;
   c. and controlling a condition relating to the dispersion of said solution within said channel in response to a measurement of a condition of at least one portion of the contents of said channel at a point between the opposite ends of said channel.

2. The method described in claim 1, in which the aqueous solution contains $Na_2CO_3$.

3. The method described in claim 1, in which the rate of flow of said gaseous product is controlled to effect substantial separation of said reaction product in a relatively dry form within said U-shaped channel.

4. The method described in claim 1, in which the dispersion of the solution is controlled in response to the measurement of the moisture content of the gaseous product.

5. The method described in claim 1, in which the dispersion of the solution is controlled in response to a measurement of the moisture content of the solid reaction product which is separated from the gaseous product.

6. A method of treating a high temperature waste gaseous product containing a chemically active substance consisting of $SO_2$, $SO_3$, or mixtures thereof, comprising the steps of:
 a. passing said gaseous product at its elevated temperature through the interior of a substantially upright U-shaped channel;
 b. dispersing as a mist into the interior of each of the vertically extending portions of said channel, an aqueous solution containing a material which reacts with the chemically active substance in said gaseous product producing a precipitate and concomitantly evaporating moisture of the mist by the elevated temperature of said gaseous product forming a separable relatively dry reaction product;
 c. controlling the rate of flow of said gaseous product through said channel to effect substantial separation of said reaction product from within the interior of said channel;
 d. and controlling the dispersion of said solution within said channel in response to a measurement of the gaseous content of said channel downstream of the point of dispersion in the first vertically extending portion of said channel.

7. A process described in claim 6 in which the dispersion of the solution is controlled in response to a measurement of condition of the contents of said channel downstream of the point of dispersion in the second vertically extending portion of said channel.

* * * * *